Jan. 7, 1947.  F. A. CONTERMAN  2,413,954
FILTERING DEVICE
Filed Dec. 2, 1943  2 Sheets-Sheet 2
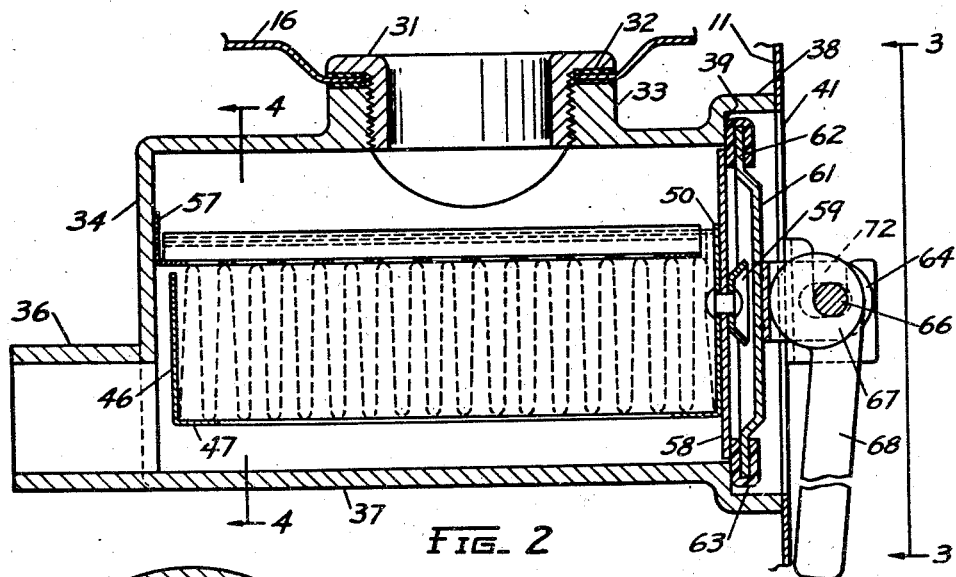
Fig. 2
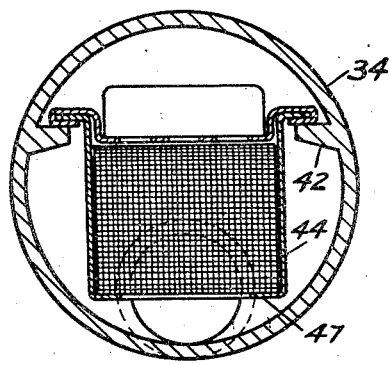
Fig. 4
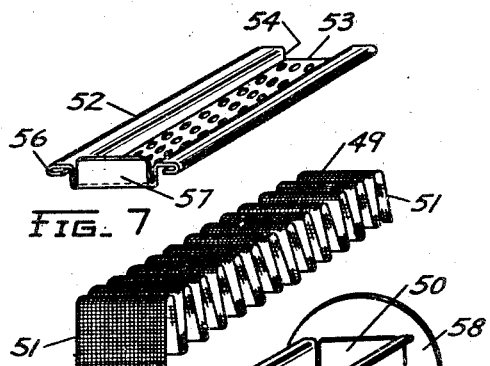
Fig. 7
Fig. 6
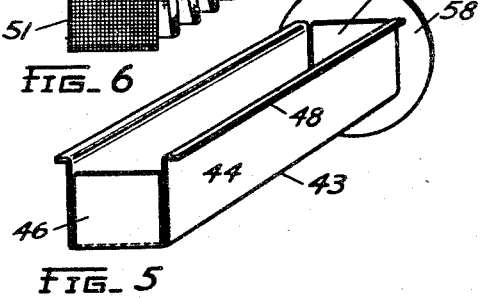
Fig. 5
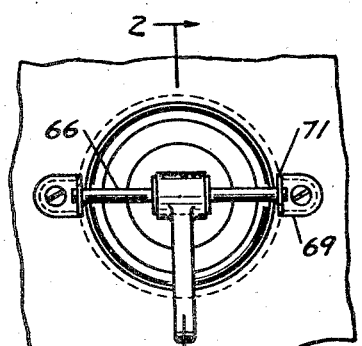
Fig. 3
Inventor
FRED A. CONTERMAN.
By Richmond S. Hayes
Attorney Patented Jan. 7, 1947

2,413,954

UNITED STATES PATENT OFFICE 2,413,954

FILTERING DEVICE

Fred A. Conterman, Jamestown, N. Y., assignor to Jamestown Metal Equipment Company, Inc., Jamestown, N. Y., a corporation of New York Application December 2, 1943, Serial No. 512,585

1 Claim. (Cl. 210—149)

This invention relates to a device for filtering water contained in such structures as washing machines.

More particularly the invention is directed to a device associable with a washing machine embodying some form of water circulating system. The device is intended to serve the purpose of filtering out inorganic matter loosened from the materials being washed, together with any soap curds that may have formed from combination with minerals in the wash water.

Prior to this invention, washing machines, with or without circulation produced by some means other than oscillation of an agitator, have either utilized a conventional trap or a simple strainer for the purpose of removing undesired matter from the wash water. In most instances these structures served only as a means of catching miscellaneous small items that might have mistakenly been left in the material to be washed, and failed, to any appreciable extent, to cleanse the wash water. If, as frequently occurs, the articles were particularly soiled or the wash water of considerable mineral content, the trap or strainer promptly became clogged and served no useful purpose. In fact, such a strainer or trap, utilized in a washing machine having a circulation system, would shortly stop such circulation altogether.

It is a purpose and one of the objects of the invention to provide a device capable of filtering or cleansing wash water over a considerable period, or during several complete washing operations, without becoming ineffective.

Another object of the invention lies in the provision of a filtering device having an area such that it will be ineffective to impede removal of the wash water from the tub or water circulation in a circulation system.

Another object of the invention lies in the provision of a filtering device accessible from the exterior of a washing machine and readily removable and easily cleaned at such time as may be required.

Another object of the invention lies in the provision of a filtering device that is suitable for installation in the line of a water circulation system in a washing machine.

Other objects and advantages of the invention will be more fully understood from a consideration of the following specification, taken in conjunction with the accompanying drawings; and in which Fig. 1 is, in part, a vertical sectional view of one form of washing machine in which a filtering device embodying the present invention may be utilized;

Fig. 2 is an enlarged vertical sectional view of the filtering device, being taken substantially on the line 2—2 of Fig. 3;

Fig. 3 is an end elevational view taken substantially as indicated by the line 3—3 of Fig. 2;

Fig. 4 is a transverse vertical sectional view taken substantially on the line 4—4 of Fig. 2;

Fig. 5 is a perspective view of the filter container;

Fig. 6 is a perspective view of the filter material receivable in the container shown in Fig. 5; and Fig. 7 is a perspective view of a perforate top or cover for the filter container.

Figure 1:
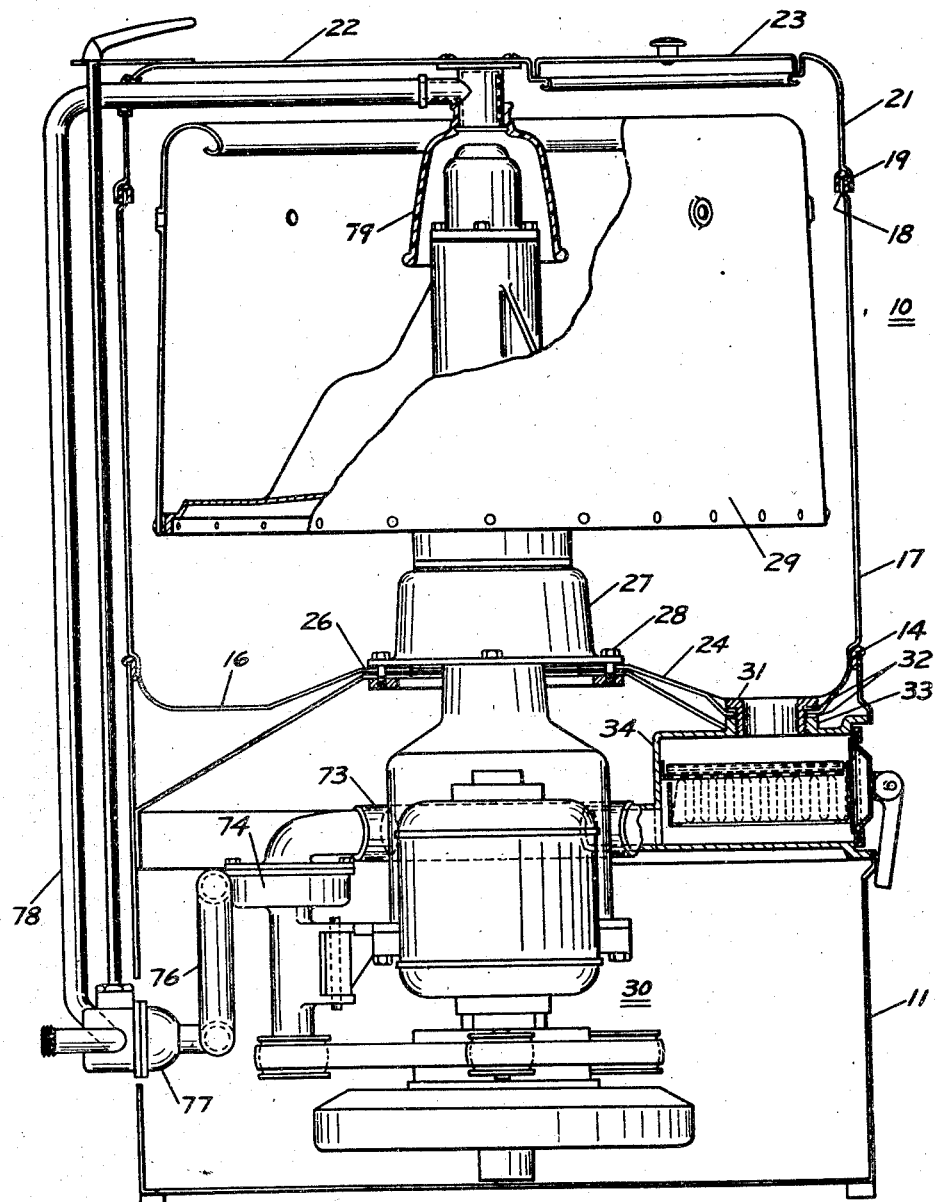

Referring more particularly to the drawings, the reference numeral 10 is employed to generally designate a washing machine in which is embodied one form of the invention. The washing machine shown is of a type in which a single receptacle is utilized to both wash and centrifugally dry materials, and comprises a base 11, substantially circular in cross section. The upper edge or rim of the base portion 11 may be fitted with a gasket 14 that forms a combined seat and seal for the inwardly offset base 16 of a tub 17. The upper rim of the tub may, as shown, have an inwardly offset flange 18 in which is located a gasket 19. This gasket serves to seat the flanged rim 21 of a top 22 of the machine. An aperture in the top 22 is closed by a suitable cover 23.

The base 16 of the tub includes an upwardly and inwardly inclined central portion 24 that terminates in an annular flange 26 which defines a central opening. A saddle 27 is secured to the flange 26 in any suitable manner, as by bolts or studs 28. This saddle, through a structure forming no part of the present invention, mounts a rotatable and oscillatable receptacle 29. A motor and drive mechanism, generally indicated at 30, serves to actuate the receptacle. At the lowest point in the base 16 of the tub there is located a drain opening framed by a collar 31. This collar projects through the opening and beneath the base wall 16 is externally threaded to engage the internal threads of a boss 33 located on the top of a substantially circular enclosure 34. To liquid seal the collar and boss with the base wall 16, suitable gaskets 32 are provided. Projecting from one end of the enclosure is a hose or flexible tube fitting 36. The lower wall of this fitting may, as shown, be a continuation of the bottom 37 of the enclosure. The other end of the enclosure terminates in a radially, outwardly offset flange 38 and annular shoulder or seat 39. This end of the enclosure may abut the inner face of the machine base wall 11, a suitable aperture 41 being made to coincide with the opening defined by the flange 38.

Interiorly of the enclosure 34 are substantially full length ledges 42 which serve to support the filter structure proper. One form of this filter structure is shown to comprise a rectangular box-like container 43 that is closed by imperforate side walls 44 and end walls 46. The base of the container is open, with the exception of flanges 47, proportioned substantially as shown. The upper edges of the side walls terminate in flanges 48. Suitable material, such as fine mesh wire screen, is accordion pleated to provide the filtering member 49. This member, as shown in Fig. 6, is adapted to be placed in the container 43, the end folds 51 resting on flanges 47, and the ends of the intermediate folds resting on flanges 47 of the side walls 44. A top 52 is provided for the container and comprises a perforate base 53 having upstanding sides 54. The sides 54 terminate in right angle, return bent flanges 56. These flanges are so spaced as to facilitate telescoping engagement with flanges 48 of the side walls of the container. Only the end 57 of the top is closed. It will, of course, be apparent that the inner end wall 46 of the container is shortened sufficiently to permit mounting the top 53 thereon, and that the open end of the top is closed by the front wall 46 of the container when these parts are assembled.

The front wall of the container includes a circular face plate 58 of a diameter to be receivable within the enclosure 34. Secured in any suitable manner to the plate 58 is a knob 59. After the filter member 49 has been placed in the container and the cover 53 slid into place, the entire structure may be placed in the enclosure 34, the flanges 56 of the cover engaging ledges 42, and the assembled structure may be moved into or out of the enclosure in the manner of movement of a conventional drawer.

When the container is in place within the enclosure, the rear wall 57 of the top 53 abuts the end wall of the enclosure, and to maintain the container in such position, a cover 61 is provided. This cover is circular and includes an inwardly offset rim 62 that is enclosed by a resilient channel gasket 63. The inner edge of the gasket abuts not only the plate 58, but the annular shoulder 39 of the enclosure as well. Centrally of the cover 61 is secured a U-shaped bracket 64 which serves to mount a shaft 66 that carries an eccentric 67 formed with a handle 68. Angle brackets 69 are secured to the outer face of the base wall 11 and the upstanding flanges 71 thereof are formed with reversely directed, open-ended slots 72. The brackets 69 are close to, and on diametrically opposite sides of the opening 41, and so disposed that the ends of shaft 66 may be projected into the slots 72.

To mount the cover 61 it is first placed against the shoulders 39 and face plate 58, with the shaft 66 in the position shown in Fig. 3 and the handle 68 substantially perpendicular to the face of the cover. By rotating the cover, the ends of shaft 66 project into slots 72 and when the handle 68 is moved into the position shown in Fig. 2, the eccentric 67 is so rotated as to apply pressure against the cover 61, causing the gasket 63 thereon to effect a fluid seal with the enclosure 34 and at the same time to sufficiently contact the face plate 58 as to prevent vibration of the container 43.

In the washing machine shown in Fig. 1, a water circulation system is provided and in the line of which the filtering device of the invention is located. From the enclosure 34, water circulation is had through a hose 73 with a pump 74, and the pump in turn connects, through hose 76 and valve 77 with a pipe 78 that extends upwardly and into the top of the machine and terminates in an outlet bell 79. Thus, after the tub and perforate receptacle 29 have been filled to the desired water level, the pump, when operated, will draw water from the base of the tub through the filtering device and return it, through the line above described, to the receptacle 29. As washing takes place and inorganic matter is loosened from the materials being washed, such matter will find its way directly into the filtering device and be caught in the folds of the filter member 49. Because of the multiplicity of folds, a considerable quantity of inorganic matter, together with any soap curds, may accumulate in these folds without impeding the water circulation. In fact, it has been found in practice that there is insufficient inorganic matter and soap curds in several machine loads of materials to entirely fill the folds of the member 49 and thereby shut off water circulation. Thus, it may be assumed that by removing the container 43 from the enclosure 34 and flushing the wire screen member 49 after each washing operation, there can be no impeding of a water circulation system, nor clogging of the drain in machines not embodying a water circulation system.

It is evident that when the member 49 has become somewhat filled, the container may be readily removed, top 53 disengaged, and the member 49 withdrawn. Following this, it is a simple matter to cleanse the member 49 by merely holding it for a time under running water, or agitating it in a water filled receptacle. The member may then be replaced, the cover engaged with the container, and the assembled structure returned to the enclosure 34.

Although applicant has shown and described his invention in association with a washing machine having a water circulation system, it is evident that the device is applicable to other types of washing machines for the purpose of filtering any wash water that it is desired to reuse, and also that the invention is subject to modification to adapt it to different types of washing machines, and such modification is considered as being within the spirit and scope of the invention insofar as it is set out in the annexed claim.

Having thus set forth my invention what I claim as new and for which I desire protection by Letters Patent is:

A filter for the drain line of a washing machine receptacle comprising a substantially cylindrical enclosure having a top opening and a bottom end opening; a container in said enclosure, means mounting said container in spaced relationship to the walls of said enclosure, said container having closed side and end walls and substantially full size top and bottom openings, a filter strip consisting of suitable mesh wire screen, said strip being folded transversely of its length, means adjacent the bottom opening of the container mounting the lower folds of said strip, and a perforate top on said container engaged with the top folds of said strip.

FRED A. CONTERMAN.